United States Patent
Wei et al.

(10) Patent No.: US 11,873,892 B2
(45) Date of Patent: Jan. 16, 2024

(54) METHOD AND SYSTEM FOR CONTROLLING GEAR OF TWO-SPEED GEARBOX

(71) Applicant: GREAT WALL MOTOR COMPANY LIMITED, Hebei (CN)

(72) Inventors: Likang Wei, Hebei (CN); Yadan Li, Hebei (CN); Chaojie Huang, Hebei (CN); Peng Luo, Hebei (CN); Hongpeng Wang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 17/767,072

(22) PCT Filed: Dec. 16, 2020

(86) PCT No.: PCT/CN2020/136764
§ 371 (c)(1),
(2) Date: Apr. 7, 2022

(87) PCT Pub. No.: WO2021/121260
PCT Pub. Date: Jun. 24, 2021

(65) Prior Publication Data
US 2022/0390006 A1    Dec. 8, 2022

(30) Foreign Application Priority Data
Dec. 17, 2019    (CN) .......................... 201911301681.4

(51) Int. Cl.
*F16H 61/02* (2006.01)
*F16H 59/14* (2006.01)
(Continued)

(52) U.S. Cl.
CPC ......... *F16H 61/0213* (2013.01); *F16H 59/14* (2013.01); *F16H 59/44* (2013.01);
(Continued)

(58) Field of Classification Search
CPC .......... F16H 59/14; F16H 59/44; F16H 59/68; F16H 59/74; F16H 2059/147;
(Continued)

(56) References Cited

U.S. PATENT DOCUMENTS

2005/0203678 A1* 9/2005 Suzuki .................. B60W 10/06
180/65.265
2008/0254935 A1* 10/2008 Kasuga .................. B60K 6/365
477/3
(Continued)

FOREIGN PATENT DOCUMENTS

| CN | 1093323 A | 10/1994 |
|---|---|---|
| CN | 101907167 A | 12/2010 |

(Continued)

OTHER PUBLICATIONS

International Search Report for PCT/CN2020/1367649 dated Mar. 16, 2021.

*Primary Examiner* — Edwin A Young
(74) *Attorney, Agent, or Firm* — Schmeiser, Olsen & Watts, LLP

(57) ABSTRACT

A method and a system for controlling a gear of the two-speed gearbox and a vehicle is provided. The method for controlling a gear of a two-speed gearbox includes: determining a first target gear of the gearbox reflecting a current driving demand of a user according to a current
(Continued)

S101
Determining a first target gear of a gearbox reflecting a current driving demand of a user according to a current vehicle-speed S102
Performing a gear intervention control of the gearbox based on at least one of the following aspects: position information of a drive gear-lever, a rotation-speed of a drive motor of a vehicle, and gear fault information of the gearbox, to shift the first target gear of the gearbox to a second target gear of the gearbox matching with real-time operation conditions of the vehicle vehicle-speed; and performing a gear intervention control of the gearbox based on at least one of the following aspects: position information of a drive gear-lever, a rotation-speed of a drive motor of a vehicle, and gear fault information of the gearbox, to shift the first target gear of the gearbox to a second target gear of the gearbox that matches with real-time operation conditions of the vehicle.

17 Claims, 2 Drawing Sheets

(51) Int. Cl.
*F16H 59/44* (2006.01)
*F16H 59/68* (2006.01)
*F16H 59/74* (2006.01)
*F16H 61/12* (2010.01)
*F16H 61/16* (2006.01)
*F16H 59/36* (2006.01)

(52) U.S. Cl.
CPC .............. *F16H 59/68* (2013.01); *F16H 59/74* (2013.01); *F16H 61/12* (2013.01); *F16H 61/16* (2013.01); *F16H 2059/147* (2013.01); *F16H 2059/366* (2013.01); *F16H 2061/0234* (2013.01); *F16H 2061/168* (2013.01)

(58) Field of Classification Search
CPC ........... F16H 2059/366; F16H 61/0213; F16H 61/12; F16H 61/16; F16H 2061/0234; F16H 2061/168
See application file for complete search history.

(56) References Cited

U.S. PATENT DOCUMENTS

| 2015/0039163 | A1* | 2/2015 | West | E02F 9/2091 180/65.265 |
| 2015/0246668 | A1* | 9/2015 | Voelkel | B60K 23/08 180/65.265 |
| 2018/0099654 | A1* | 4/2018 | Shin | B60W 10/10 |
| 2021/0094403 | A1* | 4/2021 | Lee | B60K 1/02 |

FOREIGN PATENT DOCUMENTS

| CN | 103307219 A | 9/2013 |
| CN | 103883727 A | 6/2014 |
| CN | 104019193 A | 9/2014 |
| CN | 107120426 A | 9/2017 |
| CN | 107128210 A | 9/2017 |
| CN | 107791968 A | 3/2018 |
| CN | 108107803 A | 6/2018 |
| CN | 108501765 A | 9/2018 |
| CN | 110356252 A | 10/2019 |
| CN | 110550034 A | 12/2019 |
| KR | 10-2013-0013283 A | 2/2013 |
| KR | 20130130108 A | 12/2013 |

* cited by examiner

METHOD AND SYSTEM FOR CONTROLLING GEAR OF TWO-SPEED GEARBOX

CROSS-REFERENCE TO RELATED APPLICATIONS

This application claims priority to PCT Application No. PCT/CN2020/136764, having a filing date of Dec. 16, 2020, which claims priority to Chinese Application No. 201911301681.4, having a filing date of Dec. 17, 2019, the entire contents both of which are incorporated herein by reference.

FIELD OF TECHNOLOGY

The following relates to the field of vehicle technologies, and in particular, to a method and a system for controlling a gear of a two-speed gearbox, and a vehicle.

BACKGROUND

At present, most electric or hybrid vehicles use a single-speed bridge gearbox having a fixed speed ratio. In a four-wheel drive mode, the single-speed bridge gearbox is limited by the maximum speed of the motor and cannot give more assistance to the vehicle. As a result, needs for some drivers having higher power requirements cannot be met. For the above reasons, the development of two-speed gearboxes for the electric or hybrid vehicles has been gradually carried out. However, control strategies for the two-speed gearbox may be few, and the conventional control strategies cannot ensure that the rear axle drive motor is in the optimal working range, and thus cannot meet the current needs of users.

SUMMARY

An aspect relates to a method and a system for controlling a gear of a two-speed gearbox, so as to ensure that the rear axle drive motor is in the optimal working range and meet the current needs of users.

Embodiments of the present application may be implemented as follows:

A method for controlling a gear of a two-speed gearbox is provided. The method for controlling a gear of a two-speed gearbox includes steps of: determining a first target gear of a gearbox reflecting a current driving demand of a user according to a current vehicle-speed; and performing a gear intervention control of the gearbox based on at least one of the following aspects: position information of a drive gear-lever, a rotation-speed of a drive motor of a vehicle and gear fault information of the gearbox, to shift the first target gear of the gearbox to a second target gear of the gearbox that matches with real-time operation conditions of the vehicle.

In an embodiment, the step of determining, according to the current vehicle-speed, the first target gear of the gearbox reflecting the current driving demand of the user includes: acquiring the current vehicle-speed and a current shift vehicle-speed of the gearbox. The current shift vehicle-speed of the gearbox includes a current upshift vehicle-speed and a current downshift vehicle-speed, and the current upshift vehicle-speed is greater than the current downshift vehicle-speed. if the current vehicle-speed is greater than the current upshift vehicle-speed, it is determined that the second gear of the gearbox is the first target gear; and if the current vehicle-speed is smaller than the current downshift vehicle-speed, it is determined that the first gear of the gearbox is the first target gear.

In an embodiment, the step of acquiring a current shift vehicle-speed of the gearbox includes: acquiring a current required torque and a current driving mode; and looking up in a preset correspondence table showing correspondence of a shift vehicle-speed of the gearbox with respect to a required torque and a driving mode, and acquiring the current shift vehicle-speed of the gearbox corresponding to the current required torque and the current driving mode in the correspondence table.

In an embodiment, the position information of the drive gear-lever indicates a position of the drive gear-lever and a change of the position of the drive gear-lever. The position of the drive gear-lever includes: a vehicle driving gear, a vehicle reverse gear, a vehicle parking gear, and a vehicle neutral gear. The gear intervention control of the gearbox based on the position information of the drive gear-lever includes: maintaining the first target gear of the gearbox as the second target gear of the gearbox, in case that the vehicle is in the vehicle driving gear, the vehicle parking gear or the vehicle neutral gear; shifting the first target gear of the gearbox to the first gear of the gearbox as the second target gear of the gearbox, in case that the vehicle is in the vehicle reverse gear or the vehicle is shifted from the vehicle parking gear or the vehicle neutral gear to the vehicle driving gear-lever or the vehicle reverse gear; and in case that the vehicle is shifted from the vehicle driving gear or the vehicle reverse gear to the vehicle parking gear or the vehicle neutral gear, shifting the first target gear of the gearbox to the neutral gear of the gearbox as the second target gear after a preset time, if the current vehicle-speed is greater than a preset vehicle-speed threshold; and shifting the first target gear of the gearbox directly to the neutral gear of the gearbox as the second target gear, if the current vehicle-speed is smaller than the preset vehicle-speed threshold.

In an embodiment, the gear intervention control of the gearbox based on the rotation-speed of the drive motor of the vehicle includes: shifting the first target gear of the gearbox to the neutral gear of the gearbox as the second target gear, when the rotation-speed of the drive motor of the vehicle is greater than a preset rotation-speed threshold; and maintaining the first target gear as the second target gear when the rotation-speed of the drive motor of the vehicle is smaller than or equal to the preset rotation-speed threshold.

In an embodiment, the gear intervention control of the gearbox based on the gear fault information of the gearbox includes: determining, according to a preset gear replacement sequence corresponding to each gear of the gearbox, a current gear replacement sequence corresponding to the first target gear; determining, based on the current gear replacement sequence, a replacement gear without failure to replace the first target gear; and shifting the first target gear to the replacement gear as the second target gear, when the gear fault information of the gearbox indicates that the first target gear is faulty; and maintaining the first target gear as the second target gear, when the gear fault information of the gearbox indicates that the first target gear does not fail.

In an embodiment, the step of performing the gear intervention control of the gearbox based on at least one of the following aspects: position information of a drive gear-lever, a rotation-speed of a drive motor of a vehicle, and gear fault information of the gearbox, includes: performing the gear intervention control of the gearbox according to the position information of the drive gear-lever, the rotation-speed of the drive motor of the vehicle and the gear fault information of the gearbox, in sequence.

In addition, an embodiment of the present application provides a system for controlling a gear of a two-speed gearbox, which includes: a target gear determination unit and a gear intervention unit. The target gear determination unit is configured to determine, according to a current vehicle-speed, a first target gear of a gearbox that reflects a current driving demand of a user. The gear intervention unit is configured to perform a gear intervention control of the gearbox based on at least one of the following aspects: position information of a drive gear-lever, a rotation-speed of a drive motor of a vehicle and gear fault information of the gearbox, to shift the first target gear of the gearbox to a second target gear of the gearbox matching with real-time operation conditions of the vehicle.

In addition, an embodiment of the present application provides a vehicle including the above-mentioned system for controlling the gear of the two-speed gearbox.

In addition, an embodiment of the present application provides a storage medium on which a program is stored, and when the program is executed by a processor, the above-mentioned method for controlling the gear of the two-speed gearbox is implemented.

In addition, an embodiment of the present application provides a processor for running a program, and when the program is running, the above-mentioned method for controlling the gear of the two-speed gearbox is executed.

In the present application, the method for controlling a gear of a two-speed gearbox, compared with the existing technologies, can determine the first target gear of the gearbox that reflects the current driving demand of the user according to the current vehicle-speed, so as to meet the current driving demand of the user, and then carry out the gear box intervention based on the real-time working conditions, to acquire the second target gear that matches with the real-time operation conditions of the vehicle. Through the control of the gear box position, the drive motor can be controlled, under the influence of the driving demand of the user and the intervention of the real-time working conditions of the vehicle, to always be in the optimal working range, and thus can meet the current needs of users.

Other features and advantages of the present application will be described in detail in the subsequent section of detailed description of the embodiments.

BRIEF DESCRIPTION OF THE DRAWINGS

Some of the embodiments will be described in detail, with reference to the following figures, wherein like designations denote like members, wherein.

LIST OF REFERENCE SYMBOLS

1 target gear determination unit; 2 gear intervention unit; 11 vehicle-speed acquisition module; 12 gear determination module; 121 first gear determination sub-module; 122 second gear determination sub-module; 111 torque mode acquisition sub-module; 112 vehicle-speed search sub-module;
21 first drive-gear-lever intervention module; 22 second drive-gear-lever intervention module; 23 third drive-gear-lever intervention module;
24 first motor-speed intervention module; 25 second motor-speed intervention module;
26 first gear-fault intervention module; 27 second gear-fault intervention module.

DETAILED DESCRIPTION

It should be noted that, without conflict, the embodiments of the present application and the features of the embodiments may be combined with each other.

Figure 1:
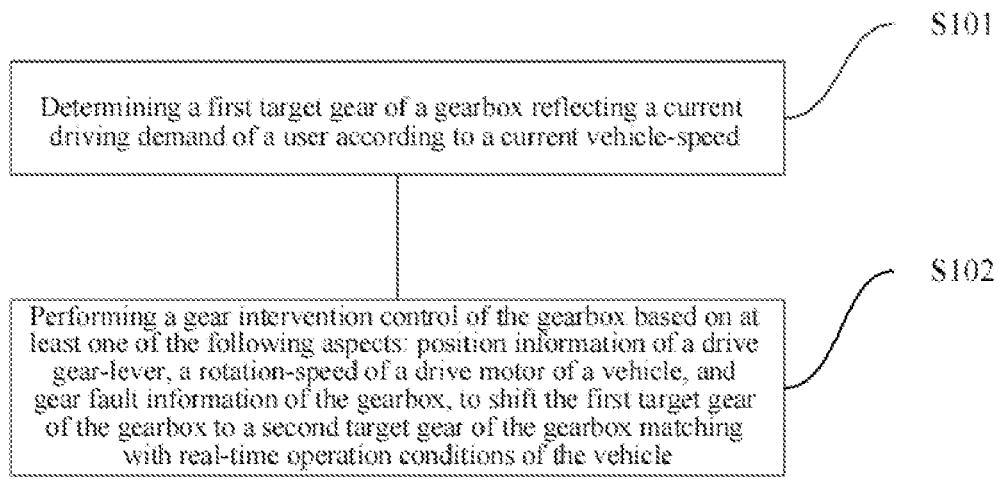
FIG. 1 is a flowchart of a method for controlling a gear of a two-speed gearbox according to an embodiment of the present application.

FIG. 1 shows a method for controlling a gear of a two-speed gearbox according to an exemplary embodiment. As shown in FIG. 1, the method for controlling the gear of the two-speed gearbox includes steps of S101 and S102:

S101: a first target gear of a gearbox reflecting a current driving demand of a user is determined according to a current vehicle-speed.

In this embodiment, the type of the gearbox is a two-speed gearbox, which has three target gears, that is, a neutral gear of the gearbox, a first gear of the gearbox and a second gear of the gearbox. Different from the present application, in the existing technologies, a single-speed gearbox is also provided. As the name implies, the single-speed gearbox has a neutral gear and a first gear of the gearbox. In the embodiment of the present application, the first target gear is one of the three gears of the two-speed gearbox.

In S101, the step of determining the first target gear of the gearbox that reflects the current driving demand of the user according to the current vehicle-speed may include the following steps: A1) acquiring a current vehicle-speed and a current shift vehicle-speed of the gearbox; and A2) determining the first target gear of the gearbox based on a comparison result of the current vehicle-speed and the current shift vehicle-speed of the gearbox.

The current vehicle-speed in the step A1) is a current driving speed of a vehicle, which reflects the current driving state of the vehicle. The current shift vehicle-speed of the gearbox shows a speed corresponding to the current driving demand of the user. Specifically, the step of acquiring the current shift vehicle-speed of the gearbox may include the following steps:

B1) acquiring a current required torque and a current driving mode, where the driving mode may include a standard mode, an economic mode (for traffic jams), a sport mode, a personalized mode, or a snow mode, etc.; and B2) looking up in a preset correspondence table showing correspondence of a shift vehicle-speed of the gearbox with respect to a required torque and a driving mode, and acquiring the current shift vehicle-speed of the gearbox corresponding to the current required torque and the current driving mode. In which, the current required torque is equivalent to a variable that affects the current shift vehicle-speed of the gearbox, and the current driving mode is equivalent to another variable that affects the current shift vehicle-speed of the gearbox. The two variables work together to determine the current shift vehicle-speed of the gearbox. The correspondence relation table including both the required torque and the driving mode and the shift vehicle-speed of the gearbox may be preset, as shown in Table 1 below.

TABLE 1

| Driving Mode | Required Torque | | | | | | | | | | | |
|---|---|---|---|---|---|---|---|---|---|---|---|---|
| | −450 | −170 | −100 | 0 | 100 | 170 | 450 | 575 | 900 | 950 | 2000 | 3000 |
| AUTO | 121 | 121 | 121 | 121 | 121 | 121 | 121 | 121 | 121 | 116 | 116 | 116 |
| ECO | 116 | 116 | 116 | 116 | 116 | 116 | 116 | 116 | 116 | 116 | 116 | 116 |
| SPORT | 122.5 | 122.5 | 122.5 | 122.5 | 122.5 | 122.5 | 122.5 | 122.5 | 122.5 | 116 | 116 | 116 |
| SNOW | 123 | 123 | 123 | 123 | 123 | 123 | 123 | 123 | 123 | 123 | 123 | 123 |
| SAVE | 122.5 | 122.5 | 122.5 | 122.5 | 122.5 | 122.5 | 122.5 | 122.5 | 116 | 116 | 116 | 116 |

In Table 1, between the required torques and the drive modes, the shift vehicle-speeds of the gearbox are shown. The AUTO is a normal mode, the ECO is an energy saving mode, the SPORT is the sport mode, the SNOW is the snow mode, and the SAVE is a power reserve mode.

In an embodiment, the current shift vehicle-speed of the gearbox includes: a current upshift vehicle-speed and a current downshift vehicle-speed, where the current upshift vehicle-speed is greater than the current downshift vehicle-speed. For example, the current upshift vehicle-speed is 30 km/h, the current downshift vehicle-speed is 20 km/h. The current upshift vehicle-speed is greater than the current downshift vehicle-speed, so that the frequent shifting of the gear of the gearbox caused when the user is driving at a speed near the current shift vehicle-speed of gearbox for a long time, can be avoided. For example, in a relatively congested road section, the vehicle-speed changes frequently between 30 km/h and 20 km/h. If the current shift vehicle-speed of the gearbox is defined as 25 km/h, the gear of the gearbox will shift frequently between the first gear and the second gear. While in the above embodiment of the present application, the upshift vehicle-speed is defined as 30 km/h, and the current downshift vehicle-speed is defined as 20 km/h, then the gear of the gearbox does not shift frequently when the driving speed of the vehicle frequently changes between 30 km/h and 20 km/h.

In the step A2), to determine the first target gear of the gearbox according to the comparison result between the current vehicle-speed and the current shift vehicle-speed of the gearbox may also include the following steps: C1) determining the second gear of the gearbox to be the first target gear, if the current vehicle-speed is greater than the current upshift vehicle-speed; and C2) determining that the first gear of the gearbox to be the first target gear if the current vehicle-speed is smaller than the current downshift vehicle-speed. For example, if the current vehicle-speed is 50 km/h and the current upshift vehicle-speed is 30 km/h, then the second gear of the gearbox is determined to be the first target gear; if the current vehicle-speed is 20 km/h, then the first gear of the gearbox is determined to be the first target gear.

S102: a gear intervention control of the gearbox is performed based on at least one of the following aspects: position information of a drive gear-lever, a rotation-speed of a drive motor of a vehicle, and gear fault information of the gearbox, to shift the first target gear of the gearbox to the second target gear of the gear box matching with real-time operation conditions of the vehicle.

The following will specifically describe how the present embodiment performs the gear intervention control of the gearbox with respect to the position information of the drive gear-lever, the rotation-speed of the drive motor of the vehicle and the gear fault information of the gearbox. The gear of the gearbox, after the above control, is matched with the real-time operation conditions of the vehicle. The vehicle working conditions include urban working conditions, sub-urban working conditions, high-speed working conditions, and the like.

1. The gear intervention control of the gearbox is performed based on the position information of the drive gear-lever.

In this embodiment, the position information of the drive gear-lever indicates a position of the drive gear-lever and a change of the position of the drive gear-lever. The position of the drive gear-lever includes: a vehicle driving gear-lever (i.e., D gear), a vehicle reverse gear (i.e., R gear), a vehicle parking gear (i.e., P gear) and a vehicle neutral gear (i.e., N gear). It should be noted that the position of the drive gear-lever is different from the gear of the gearbox in the present application, and the position of the drive gear-lever is the position of the drive gear-lever in the vehicle.

The specific control modes may be implemented as follows:

1) maintaining the first target gear of the gearbox as the second target gear of the gearbox when the vehicle is in the vehicle D gear, the vehicle P gear or the vehicle N gear. For example, when the vehicle is in the vehicle D gear, the vehicle P gear or the vehicle N gear, the second target gear of the gearbox is equal to the first target gear, and if the first target gear is the first gear, then the second target gear is also the first gear. If the first target gear is the second gear, the second target gear is also the second gear, which is suitable for the high-speed working conditions or the suburban working conditions.

2) shifting the first target gear of the gearbox to the first gear of the gearbox as the second target gear of the gearbox, when the vehicle is in the vehicle R gear or the vehicle is shifted from the vehicle P gear or the vehicle N gear to the vehicle D gear or the vehicle R gear. Since the vehicle-speed of the vehicle R gear generally does not exceed 40 km/h, the gear of the gearbox can be directly shifted to the first gear. When the vehicle is shifted from the vehicle P gear or the vehicle N gear to the vehicle D gear or the vehicle R gear, the gear of the gearbox is shifted from the first target gear (the neutral gear of the gearbox) to the first gear.

3) shifting the first target gear of the gearbox to the neutral gear of the gearbox as the second target gear after a preset time, when the vehicle is shifted from the vehicle D gear or the vehicle R gear to the vehicle P gear or the vehicle N gear; and shifting the first target gear of the gearbox directly to the neutral gear of the gearbox as the second target gear, when the current vehicle-speed is smaller than a preset vehicle-speed threshold. In which, the preset time may be 2 minutes. The purpose of this delay is to avoid the frequent shifting of the gearbox (because the time for red-light is generally 90 s, avoiding the frequent gear shifting during the red-light time) caused by frequent start-and-stop of the vehicle on the road, which may be suitable for the urban working conditions. With the above method, the life of the gearbox can be prolonged, and when the vehicle starts after a stop, the power response of starting can be accelerated, and the process of shifting the gearbox from the neutral gear of the gearbox to the first gear of the gearbox can be avoided. When the vehicle-speed is very low (smaller than the vehicle-speed threshold), the judgment of the N gear may be waiting for the red light, so there is a delay. If the vehicle-speed is greater than the vehicle-speed threshold, the judgment of the N gear may be that the driver just wants to travel in neutral gear, thus the gear will directly, without violating the intention of the driver, become the neutral gear following the gear-lever. The vehicle-speed threshold may be 30 km/h.

2. The gear intervention control of the gearbox is performed based on the rotation-speed of the drive motor of the vehicle.

In this embodiment, the rotation-speed of the drive motor of the vehicle may be the rotation-speed of the vehicle rear-axle drive motor. In which, the drive motor generally has its maximum rotation-speed. In this embodiment, the maximum rotation-speed of the vehicle rear axle drive motor may be set to perform the gear intervention control of the gearbox.

The specific control modes may be implemented as follows:

1) shifting the first target gear of the gearbox to the neutral gear of the gearbox as the second target gear, when the rotation-speed of the drive motor of the vehicle is greater than a preset rotation-speed threshold. For example, if the rotation-speed of the drive motor of the vehicle is 12000 r/min and the preset rotation-speed threshold is 10000 r/min, then the first target gear of the gearbox is directly shifted to the neutral gear of the gearbox to protect the drive motor.

2) maintaining the first target gear as the second target gear, when the rotation-speed of the drive motor of the vehicle is smaller than or equal to the preset rotation-speed threshold. For example, if the rotation-speed of the drive motor of the vehicle is 8000 r/min and the preset rotation-speed threshold is 10000 r/min, then the first target gear is maintained as the second target gear.

3. The gear intervention control of the gearbox is performed based on the gear fault information of the gearbox.

In this embodiment, the gear fault information of the gearbox is mainly used to indicate whether the gear of the gearbox is faulty.

The specific control modes may be implemented as follows:

1) determining, according to a preset gear replacement sequence corresponding to each gear of the gearbox, a current gear replacement sequence corresponding to the first target gear, when the gear fault information of the gearbox indicates that the first target gear is faulty; determining, based on the current gear replacement sequence, a replacement gear without failure to replace the first target gear; and shifting the first target gear to the replacement gear as the second target gear. For example, it is determined that the first target gear is the first gear of the gearbox, and if the gear fault information of the gearbox indicates that the first gear of the gearbox is faulty, then it is determined, according to the preset gear replacement sequence when the first gear of the gearbox fails, that the gear replacement sequence corresponding to the first gear of the gearbox is the second gear of the gearbox and the neutral gear of the gearbox. That is, if the second gear of the gearbox does not fail, then the first gear of the gearbox is shifted to the second gear of the gearbox as the second target gear. If the second gear of the gearbox also fails, then the first gear of the gearbox is directly shifted to the neutral gear of the gearbox. It is determined that the first target gear is the second gear of the gearbox, and if the second gear of the gearbox fails, then it is determined, according to the preset gear replacement sequence when the second gear of the gearbox fails, that the gear replacement sequence corresponding to the second gear of the gearbox is the first gear of the gearbox and the neutral gear of the gearbox. That is, if the first gear of the gearbox does not fail, then the second gear of the gearbox is shifted to the first gear of the gearbox as the second target gear. If the first gear of the gearbox fails, the second gear of the gearbox is shifted to the neutral gear of the gearbox.

2) maintaining the first target gear as the second target gear, when the gear fault information of the gearbox indicates that the first target gear does not fail.

Figure 2:
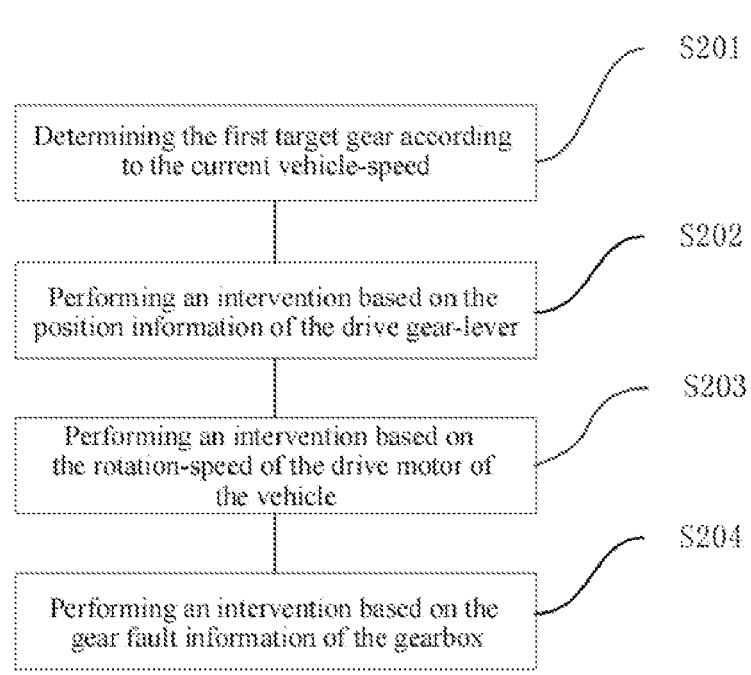
FIG. 2 is a flowchart of a method for controlling a gear of a two-speed gearbox according to an embodiment of the present application.

In an embodiment, FIG. 2 is a flowchart of the gear intervention control of the gearbox. As shown in FIG. 2, the step of performing the gear intervention control of the gearbox based on at least one of the following aspects: the position information of the drive gear-lever, the rotation-speed of the drive motor of the vehicle, and the gear fault information of the gearbox, may include: performing the gear intervention control of the gearbox, according to the position information of the drive gear-lever, the rotation-speed of the drive motor of the vehicle and the gear fault information of the gearbox, in sequence.

In other words, among the position information of the drive gear-lever, the rotation-speed of the drive motor of the vehicle, and the gear fault information of the gearbox, the gear intervention of the gearbox is first controlled based on the position information of the drive gear-lever; then the gear intervention of the gearbox is controlled based on the rotation-speed of the drive motor of the vehicle; and finally the gear intervention of the gearbox is controlled through the gear fault information of the gearbox to obtain the final gear of the gearbox.

Specifically, as shown in FIG. 2, the following steps are included: S201, determining the first target gear according to the current vehicle-speed; S202, performing an intervention on the first target gear based on the position information of the drive gear-lever to obtain the second target gear; S203, performing an intervention on the second target gear based on the rotation-speed of the drive motor of the vehicle to obtain the third target gear; and S204, performing an intervention on the third target gear based on the gear fault information of the gearbox to obtain the final gear. By way of example, in S201, if the current vehicle-speed is greater than a preset shift vehicle-speed, the first target gear is the second gear of the gearbox, and if the current vehicle-speed is smaller than the preset shift vehicle-speed, the first target gear is the first gear of the gearbox. In S202, when the P or N gear is shifted to the D or R gear, the gear of the rear axle gearbox is shifted from the N gear to the first gear; and when the D or R gear is shifted to the P or N gear, the gear of the rear axle should be delayed to shift to the N gear. The purpose of this delay is to avoid frequent shifting of the rear axle caused by the frequent start-and-stop of the vehicle on urban roads when the vehicle motor is driven, prolong the lifetime of the rear axle gearbox, and accelerate the power response of starting. The delay time should be in about 2 minutes (because the time for red-light is generally about 90 s). In R gear, the second target gear should always be the first gear (because the vehicle-speed in reverse gear will not exceed 40 km/h); and in D gear, the second target gear should be equal to the first target gear. In S203, when the rotation-speed of the drive motor exceeds the allowed maximum rotation-speed, in order to protect the drive motor, the third target gear should be the N gear of the gearbox; when the rotation-speed of the drive motor is within the allowable range, the third target gear should be equal to the second target gear. In S204, when the gear of the rear axle is unavailable due to failure or other reasons: in case that the third target gear is the first gear of the gearbox, and the first gear of the gearbox is unavailable, if the second gear of the gearbox is available, then the final gear is the second gear of the gearbox; if the second gear of the gearbox is also unavailable and the N gear of the gearbox is available, then the final gear is the N gear of the gearbox. In case that the third target gear is the second gear of the gearbox, and the second gear of the gearbox is unavailable, if the first gear of the gearbox is available, then the final gear is the first gear of the gearbox; if the first gear of the gearbox is unavailable and the N gear of the gearbox is available, the final gear is the N gear of the gearbox. In case that the third target gear is the N gear, then the final gear, same as the above, is sequentially selected to be the N gear, the first gear and the second gear of the gearbox.

In accordance with the above-mentioned embodiment, the two-speed gearbox can increase the power performance of the vehicle and meet the power demand of the user. The gear of the two-speed gearbox is intervened according to the real-time operation conditions of the vehicle, the gear intervention control of the gearbox based on the position information of the drive gear-lever can reduce the number of gear shifts in congested road sections (urban working conditions) during the user's use of the vehicle; the gear intervention control of the gearbox based on the rotation-speed of the drive motor of the vehicle can avoid the drive motor from over-speeding; and the gear intervention control of the gearbox based on the gear fault information of the gearbox can avoid the failure of the gearbox, thereby greatly improving the service life of the gearbox and the performance of noise, vibration and harshness (NVH, Noise, Vibration, Harshness), and effectively reducing the failure rate. This embodiment can ensure that the rear axle drive motor is in the optimal working range, and meanwhile ensure the driving power and economy performances of the vehicle.

Figure 3:
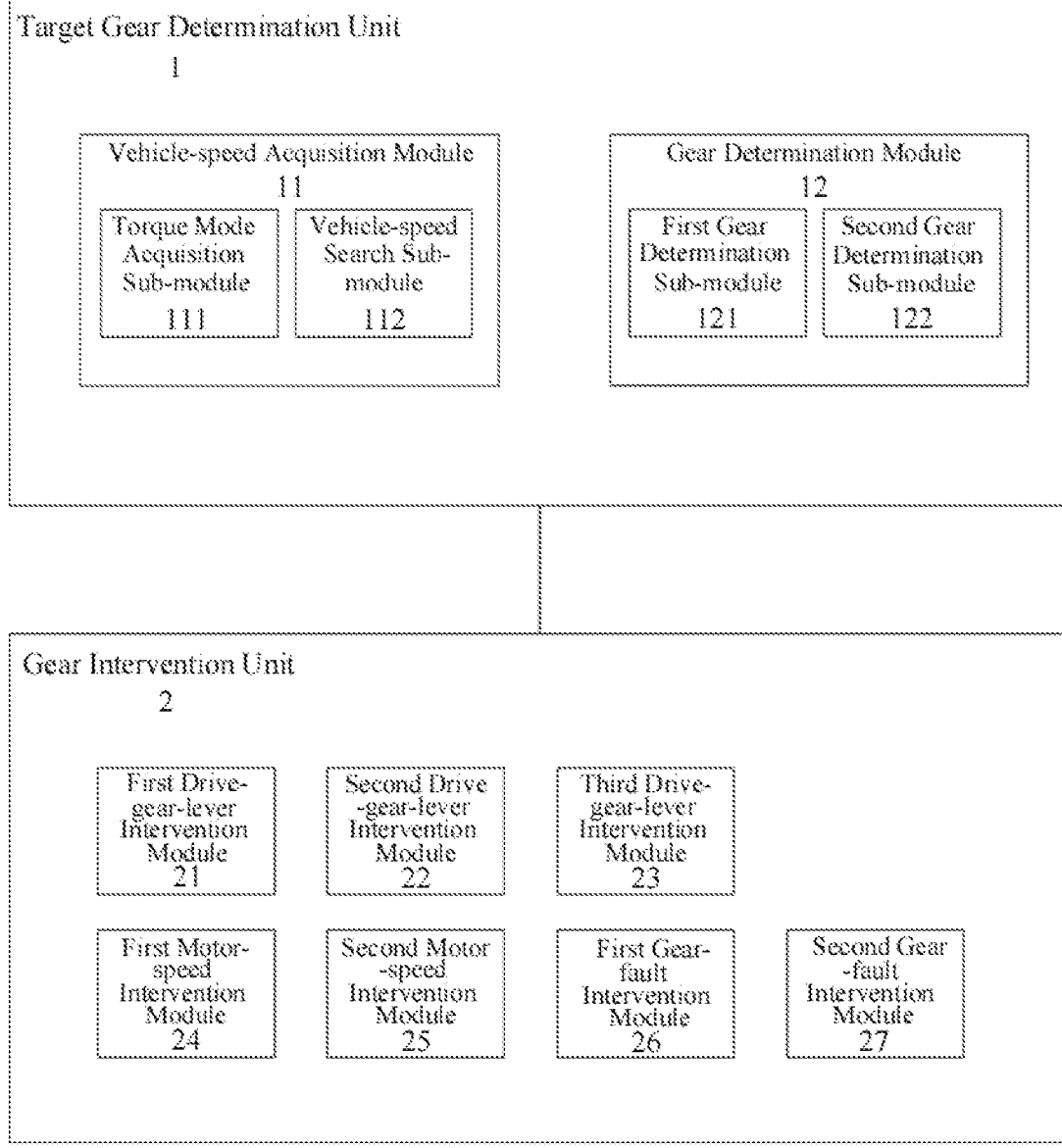
FIG. 3 is a block diagram of modules of the system for controlling the gear of the two-speed gearbox according to an embodiment of the present application.

FIG. 3 is a block diagram of a system for controlling a gear of a two-speed gearbox. As shown in FIG. 3, the system for controlling the gear of the two-speed gearbox includes: a target gear determination unit 1, which is configured to determine a first target gear of the gearbox reflecting a current driving demand of a user according to a current vehicle-speed; and a gear intervention unit 2, which is configured to perform a gear intervention control of the gearbox based on at least one of the following aspects: position information of a drive gear-lever, rotation-speed of a drive motor of a vehicle and gear fault information of the gearbox, to shift the first target gear of the gearbox to a second target gear of the gearbox matching with real-time operation conditions of the vehicle.

In an embodiment, the target gear determination unit 1 includes: a vehicle-speed acquisition module 11, which is configured to acquire the current vehicle-speed and a current shift vehicle-speed of the gearbox; and a gear determination module 12, which is configured to determine the first target gear of the gearbox based on a comparison result of the current vehicle-speed and the current shift vehicle-speed of the gearbox.

In an embodiment, the current shift vehicle-speed of the gearbox includes: a current upshift vehicle-speed and a current downshift vehicle-speed, where the current upshift vehicle-speed is greater than the current downshift vehicle-speed. The gear determination module 12 includes: a first gear determination sub-module 121, which is configured to determine that the second gear of the gearbox is the first target gear, if the current vehicle-speed is greater than the current upshift vehicle-speed; and a second gear determination sub-module 122, which is configured to determine that the first gear of the gearbox is the first target gear, if the current vehicle-speed is smaller than the current downshift vehicle-speed.

In an embodiment, the vehicle-speed acquisition module 11 includes: a torque mode acquisition sub-module 111, which is configured to acquire a current required torque and a current driving mode; and a vehicle-speed search sub-module 112, which is configured to, according to a correspondence table showing correspondence between both a preset required torque and a driving mode and a shift vehicle-speed of the gear box, look up in the correspondence table and to acquire the current shift vehicle-speed of the gearbox corresponding to the current required torque and the current driving mode.

In an embodiment, the position information of the drive gear-lever indicates a position of the drive gear-lever and a change of the position of the drive gear-lever, where the position of the drive gear-lever includes: a vehicle driving gear-lever, a vehicle reverse gear, a vehicle parking gear and a vehicle neutral gear. The gear intervention unit 2 includes: a first drive-gear-lever intervention module 21, a second drive-gear-lever intervention module 22, and a third drive-gear-lever intervention module 23. The first drive-gear-lever intervention module 21 is configured to maintain the first target gear of the gearbox as the second target gear of the gearbox when the vehicle is in the vehicle driving gear-lever, the vehicle parking gear or a vehicle neutral gear. The second drive-gear-lever intervention module 22 is configured to shift the first target gear of the gearbox to the first gear of the gearbox as the second target gear of the gearbox, when the vehicle is in the vehicle reverse gear or the vehicle is shifted from the vehicle parking gear or the vehicle neutral gear to the vehicle driving gear-lever or the vehicle reverse gear. The third drive-gear-lever intervention module 23 is configured to shift the first target gear of the gearbox to the neutral gear of the gearbox as the second target gear after a preset time, when the vehicle is shifted from the vehicle driving gear-lever or the vehicle reverse gear to the vehicle parking gear or the vehicle neutral gear.

In an embodiment, the gear intervention unit 2 includes: a first motor-speed intervention module 24 and a second motor-speed intervention module 25. The first motor-speed intervention module 24 is configured to shift the first target gear of the gearbox to the neutral gear of the gearbox as the second target gear when the rotation-speed of the drive motor of the vehicle is greater than a preset rotation-speed threshold. The second motor-speed intervention module 25 is configured to maintain the first target gear as the second target gear when the rotation-speed of the drive motor of the vehicle is smaller than or equal to the preset rotation-speed threshold.

In an embodiment, the gear intervention unit 2 includes: a first gear-fault intervention module 26 and a second gear-fault intervention module 27. The first gear-fault intervention module 26 is configured to, when the gear fault information of the gearbox indicates that the first target gear is faulty, determine a current gear replacement sequence corresponding to the first target gear according to a preset gear replacement sequence corresponding to each gear of the gearbox, determine a replacement gear without failure according to the current gear replacement sequence to replace the first target gear, and shift the first target gear to the replacement gear as the second target gear. The second gear-fault intervention module 27 is configured to maintain the first target gear as the second target gear when the gear fault information of the gearbox indicates that the first target gear does not fail.

In an embodiment, the gear intervention unit 2 is configured to perform the gear intervention control of the gearbox based on at least one of the following aspects: the position information of the drive gear-lever, the rotation-speed of the drive motor of the vehicle, and the gear fault information of the gearbox, includes that: the gear intervention unit 2 is configured to perform the gear intervention control of the gearbox according to the position information of the drive gear-lever, the rotation-speed of the drive motor of the vehicle and the gear fault information of the gearbox, in sequence.

The system for controlling the gear of the two-speed gearbox, compared with the existing technologies, has the same schemes and effects as that of the above method embodiments, which will not be repeated here.

In addition, the present application also provides a vehicle, which includes the system for controlling the gear of the two-speed gearbox as above-mentioned.

The system for controlling the gear of the two-speed gearbox includes a processor and a memory. The target gear determination unit 1, the gear intervention unit 2, etc., as above-mentioned are all stored in the memory as program units, and the processor executes the above-mentioned program units stored in the memory to achieve the corresponding function.

The processor includes processor-cores, and the processor-cores retrieve the corresponding program units from the memory. One or more of the processor-cores may be set, and the self-test of the model can be realized by adjusting the core parameters.

Memory may include non-persistent memory in computer readable media, random access memory (RAM) and/or non-volatile memory, such as read only memory (ROM) or flash memory (flash RAM). The memory includes at least one memory chip.

An embodiment of the present application provides a storage medium, on which a program is stored, and when the program is executed by a processor, the method for controlling the gear of the two-speed gearbox is implemented.

An embodiment of the present application provides a processor for running a program, and when the program is running, the method for controlling the gear of the two-speed gearbox is executed.

The present application also provides a computer program product, which is adapted to execute programs initialized with the steps of the method embodiment when being executed on a data processing device.

It should be understood for those skilled in the art, the embodiments of the present application may be provided as a method, a system, or a computer program product. Accordingly, the present application may be achieved with an entire hardware embodiment, an entire software embodiment, or an embodiment combining software and hardware aspects. Furthermore, the present application may be achieved in the form that the computer program products are executed on one or more computer-usable storage media (including, but not limited to, disk storage, CD-ROM, optical storage, etc.) having computer-usable program code embodied therein.

The present application is described with reference to flowcharts and/or block diagrams of methods, apparatus (systems), and computer program products according to the embodiments of the present application. It should be understood that each flow and/or block in the flowcharts and/or block diagrams, and combinations of flows and/or blocks in the flowcharts and/or block diagrams, can be implemented by computer program instructions. These computer program instructions may be provided to the processor of a general-purpose computer, a special purpose computer, an embedded processor or other programmable data processing devices to generate a machine, such that the instructions executed by the processor of the computer or other programmable data processing devices produce to generate an apparatus for implementing the functions specified in one or more flows of the flowcharts and/or one or more blocks of the block diagrams.

These computer program instructions may also be stored in a computer-readable memory capable of directing a computer or other programmable data processing devices to function in a particular manner, such that the instructions stored in the computer-readable memory result in an article of manufacture comprising instruction apparatuses, the instruction apparatuses implement the functions specified in the one or more flows of the flowcharts and/or the one or more blocks of the block diagrams.

These computer program instructions can also be loaded on a computer or other programmable data processing devices to cause a series of operational steps to be performed on the computer or other programmable devices to generate a computer-implemented process such that the instructions executed on the computer or other programmable devices provide steps for implementing the functions specified in the one or more flows of the flowcharts and/or the one or more blocks of the block diagrams.

In a typical configuration, a computing device includes one or more processors (CPUs), input/output interfaces, network interfaces, and a memory.

Memory may include non-persistent memory in computer readable media, random access memory (RAM) and/or non-volatile memory, such as read only memory (ROM) or flash memory (flash RAM), The memory may be an example of a computer-readable medium.

Computer-readable media includes both persistent and non-persistent, removable and non-removable media, and storage of information may be implemented by any method or technology. Information may be computer readable instructions, data structures, modules of programs, or other data. Examples of computer storage media include, but are not limited to, phase-change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic tape cassettes, magnetic tape magnetic disk storage or other magnetic storage devices or any other non-transmission medium capable of storing information that can be accessed by a computing device. As defined herein, the computer-readable media does not include transitory computer-readable media, such as modulated data signals and carrier waves.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A method for controlling a gear of a two-speed gearbox having at least a first gear and a second gear, the method comprising:
   determining a first target gear of the gearbox reflecting a current driving demand of a user according to a current vehicle-speed; and
   performing a gear intervention control of the gearbox based on at least one of the following aspects:
   a position information of a drive gear-lever, a rotation-speed of a drive motor of a vehicle, and a gear fault information of the gearbox, to shift the first target gear of the gearbox to a second target gear of the gearbox matching with real-time operation conditions of the vehicle,
   wherein the gear intervention control of the gearbox based on the rotation-speed of the drive motor of the vehicle comprises:
     shifting the first target gear of the gearbox to a neutral gear of the gearbox as the second target gear, when the rotation-speed of the drive motor of the vehicle is greater than a preset rotation-speed threshold; and
     maintaining the first target gear as the second target gear when the rotation-speed of the drive motor of the vehicle is smaller than or equal to the preset rotation-speed threshold.

2. The method according to claim 1, wherein the determining the first target gear of the gearbox reflecting the current driving demand of the user according to the current vehicle-speed comprises:
   acquiring the current vehicle-speed and a current shift vehicle-speed of the gearbox, wherein the current shift vehicle-speed of the gearbox comprises a current upshift vehicle-speed and a current downshift vehicle-speed, and the current upshift vehicle-speed is greater than the current downshift vehicle-speed;
   determining the second gear of the gearbox to be the first target gear, when the current vehicle-speed is greater than the current upshift vehicle-speed; and
   determining the first gear of the gearbox to be the first target gear, when the current vehicle-speed is smaller than the current downshift vehicle-speed.

3. The method according to claim 2, wherein the acquiring the current shift vehicle-speed of the gearbox comprises:
   acquiring a current required torque and a current driving mode; and
   looking up in a preset correspondence table showing correspondence of a shift vehicle-speed of the gearbox with respect to a required torque and a driving mode, and acquiring the current shift vehicle-speed of the gearbox corresponding to the current required torque and the current driving mode in the preset correspondence table.

4. The method according to claim 1, wherein the position information of the drive gear-lever indicates a position of the drive gear-lever and a change of the position of the drive gear-lever, wherein the position of the drive gear-lever comprises: a vehicle driving gear, a vehicle reverse gear, a vehicle parking gear, and a vehicle neutral gear; and
   the gear intervention control of the gearbox based on the position information of the drive gear-lever comprises:
     maintaining the first target gear of the gearbox as the second target gear of the gearbox, when the vehicle is in the vehicle driving gear, the vehicle parking gear or the vehicle neutral gear;
     shifting the first target gear of the gearbox to the first gear of the gearbox as the second target gear of the gearbox, when the vehicle is in the vehicle reverse gear or the vehicle is shifted from the vehicle parking gear or the vehicle neutral gear to the vehicle driving gear or the vehicle reverse gear; and
     in case that the vehicle is shifted from the vehicle driving gear or the vehicle reverse gear to the vehicle parking gear or the vehicle neutral gear,
       shifting the first target gear of the gearbox to the neutral gear of the gearbox as the second target gear after a preset time, when the current vehicle-speed is greater than a preset vehicle-speed threshold; and
       shifting the first target gear of the gearbox directly to the neutral gear of the gearbox as the second target gear, when the current vehicle-speed is smaller than the preset vehicle-speed threshold.

5. The method according to claim 1, wherein the gear intervention control of the gearbox based on the gear fault information of the gearbox comprises:
   determining, according to a preset gear replacement sequence corresponding to each gear of the gearbox, a current gear replacement sequence corresponding to the first target gear;
   determining, based on the current gear replacement sequence, a replacement gear without failure to replace the first target gear, and shifting the first target gear to the replacement gear as the second target gear, when the gear fault information of the gearbox indicates that the first target gear is faulty; and
   maintaining the first target gear as the second target gear, when the gear fault information of the gearbox indicates that the first target gear does not fail.

6. The method according to claim 1, wherein the performing the gear intervention control of the gearbox comprises:
   performing the gear intervention control of the gearbox according to the position information of the drive gear-lever, the rotation-speed of the drive motor of the vehicle and the gear fault information of the gearbox, in sequence.

7. A non-transitory computer-readable storage medium, on which a program is stored, wherein the program, when being executed by a processor, cause the processor to perform operations that comprise:
   determining a first target gear of a gearbox reflecting a current driving demand of a user according to a current vehicle-speed; and
   performing a gear intervention control of the gearbox based on at least one of the following aspects: a position information of a drive gear-lever, a rotation-speed of a drive motor of a vehicle, and a gear fault information of the gearbox, to shift the first target gear of the gearbox to a second target gear of the gearbox matching with real-time operation conditions of the vehicle, wherein the gear intervention control of the gearbox based on the rotation-speed of the drive motor of the vehicle comprises:
  shifting the first target gear of the gearbox to a neutral gear of the gearbox as the second target gear, when the rotation-speed of the drive motor of the vehicle is greater than a preset rotation-speed threshold; and
  maintaining the first target gear as the second target gear when the rotation-speed of the drive motor of the vehicle is smaller than or equal to the preset rotation-speed threshold.

8. The non-transitory computer-readable storage medium according to claim 7, wherein the operation of determining the first target gear of the gearbox reflecting the current driving demand of the user according to the current vehicle-speed comprises:
  acquiring the current vehicle-speed and a current shift vehicle-speed of the gearbox, wherein the current shift vehicle-speed of the gearbox comprises a current upshift vehicle-speed and a current downshift vehicle-speed, and the current upshift vehicle-speed is greater than the current downshift vehicle-speed;
  determining a second gear of the gearbox to be the first target gear, when the current vehicle-speed is greater than the current upshift vehicle-speed; and
  determining a first gear of the gearbox to be the first target gear, when the current vehicle-speed is smaller than the current downshift vehicle-speed.

9. The non-transitory computer-readable storage medium according to claim 8, wherein the current shift vehicle-speed of the gearbox is acquired based on the following operations:
  acquiring a current required torque and a current driving mode; and
  looking up in a preset correspondence table showing correspondence of a shift vehicle-speed of the gearbox with respect to a required torque and a driving mode, and acquiring the current shift vehicle-speed of the gearbox corresponding to the current required torque and the current driving mode in the preset correspondence table.

10. The non-transitory computer-readable storage medium according to claim 7, wherein the position information of the drive gear-lever indicates a position of the drive gear-lever and a change of the position of the drive gear-lever, wherein the position of the drive gear-lever comprises: a vehicle driving gear, a vehicle reverse gear, a vehicle parking gear, and a vehicle neutral gear; and
  the gear intervention control of the gearbox based on the position information of the drive gear-lever comprises:
    maintaining the first target gear of the gearbox as the second target gear of the gearbox, when the vehicle is in the vehicle driving gear, the vehicle parking gear or the vehicle neutral gear;
    shifting the first target gear of the gearbox to the first gear of the gearbox as the second target gear of the gearbox, when the vehicle is in the vehicle reverse gear or the vehicle is shifted from the vehicle parking gear or the vehicle neutral gear to the vehicle driving gear or the vehicle reverse gear; and
    in case that the vehicle is shifted from the vehicle driving gear or the vehicle reverse gear to the vehicle parking gear or the vehicle neutral gear,
      shifting the first target gear of the gearbox to the neutral gear of the gearbox as the second target gear after a preset time, when the current vehicle-speed is greater than a preset vehicle-speed threshold; and
      shifting the first target gear of the gearbox directly to the neutral gear of the gearbox as the second target gear, when the current vehicle-speed is smaller than the preset vehicle-speed threshold.

11. The non-transitory computer-readable storage medium according to claim 7, wherein the gear intervention control of the gearbox based on the gear fault information of the gearbox comprises:
  determining, according to a preset gear replacement sequence corresponding to each gear of the gearbox, a current gear replacement sequence corresponding to the first target gear;
  determining, based on the current gear replacement sequence, a replacement gear without failure to replace the first target gear, and shifting the first target gear to the replacement gear as the second target gear, when the gear fault information of the gearbox indicates that the first target gear is faulty; and
  maintaining the first target gear as the second target gear, when the gear fault information of the gearbox indicates that the first target gear does not fail.

12. The non-transitory computer-readable storage medium according to claim 7, wherein the operation of performing the gear intervention control of the gearbox comprises:
  performing the gear intervention control of the gearbox according to the position information of the drive gear-lever, the rotation-speed of the drive motor of the vehicle and the gear fault information of the gearbox, in sequence.

13. A processor for running a program, wherein, when the program is running on the processor, the following operations are performed:
  determining a first target gear of a gearbox reflecting a current driving demand of a user according to a current vehicle-speed; and
  performing a gear intervention control of the gearbox based on at least one of the following aspects: a position information of a drive gear-lever, a rotation-speed of a drive motor of a vehicle, and a gear fault information of the gearbox, to shift the first target gear of the gearbox to a second target gear of the gearbox matching with real-time operation conditions of the vehicle,
  wherein the gear intervention control of the gearbox based on the rotation-speed of the drive motor of the vehicle comprises:
    shifting the first target gear of the gearbox to a neutral gear of the gearbox as the second target gear, when the rotation-speed of the drive motor of the vehicle is greater than a preset rotation-speed threshold; and
    maintaining the first target gear as the second target gear when the rotation-speed of the drive motor of the vehicle is smaller than or equal to the preset rotation-speed threshold.

14. The processor according to claim 13, wherein the operation of determining the first target gear of the gearbox reflecting the current driving demand of the user according to the current vehicle-speed comprises:
  acquiring the current vehicle-speed and a current shift vehicle-speed of the gearbox, wherein the current shift vehicle-speed of the gearbox comprises a current upshift vehicle-speed and a current downshift vehicle-speed, and the current upshift vehicle-speed is greater than the current downshift vehicle-speed;

determining a second gear of the gearbox to be the first target gear, when the current vehicle-speed is greater than the current upshift vehicle-speed; and determining a first gear of the gearbox to be the first target gear, when the current vehicle-speed is smaller than the current downshift vehicle-speed.

15. The processor according to claim 14, wherein the current shift vehicle-speed of the gearbox is acquired based on the following operations:

acquiring a current required torque and a current driving mode; and looking up in a preset correspondence table showing correspondence of a shift vehicle-speed of the gearbox with respect to a required torque and a driving mode, and acquiring the current shift vehicle-speed of the gearbox corresponding to the current required torque and the current driving mode in the preset correspondence table.

16. The processor according to claim 13, wherein the position information of the drive gear-lever indicates a position of the drive gear-lever and a change of the position of the drive gear-lever, wherein the position of the drive gear-lever comprises: a vehicle driving gear, a vehicle reverse gear, a vehicle parking gear, and a vehicle neutral gear; and the gear intervention control of the gearbox based on the position information of the drive gear-lever comprises:

maintaining the first target gear of the gearbox as the second target gear of the gearbox, when the vehicle is in the vehicle driving gear, the vehicle parking gear or the vehicle neutral gear;

shifting the first target gear of the gearbox to the first gear of the gearbox as the second target gear of the gearbox, when the vehicle is in the vehicle reverse gear or the vehicle is shifted from the vehicle parking gear or the vehicle neutral gear to the vehicle driving gear or the vehicle reverse gear; and in case that the vehicle is shifted from the vehicle driving gear or the vehicle reverse gear to the vehicle parking gear or the vehicle neutral gear, shifting the first target gear of the gearbox to the neutral gear of the gearbox as the second target gear after a preset time, when the current vehicle-speed is greater than a preset vehicle-speed threshold; and shifting the first target gear of the gearbox directly to the neutral gear of the gearbox as the second target gear, when the current vehicle-speed is smaller than the preset vehicle-speed threshold.

17. The processor according to claim 13, wherein the gear intervention control of the gearbox based on the gear fault information of the gearbox comprises:

determining, according to a preset gear replacement sequence corresponding to each gear of the gearbox, a current gear replacement sequence corresponding to the first target gear;

determining, based on the current gear replacement sequence, a replacement gear without failure to replace the first target gear, and shifting the first target gear to the replacement gear as the second target gear, when the gear fault information of the gearbox indicates that the first target gear is faulty; and maintaining the first target gear as the second target gear, when the gear fault information of the gearbox indicates that the first target gear does not fail.

* * * * *